US011946309B2

(12) United States Patent
Gore et al.

(10) Patent No.: US 11,946,309 B2
(45) Date of Patent: Apr. 2, 2024

(54) ADJUSTABLE BUMPER DESIGN FOR HOME APPLIANCES

(71) Applicant: WHIRLPOOL CORPORATION, Benton Harbor, MI (US)

(72) Inventors: Rohan Gajananrao Gore, Stevensville, MI (US); David Gregory Quante, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 748 days.

(21) Appl. No.: 16/994,755

(22) Filed: Aug. 17, 2020

(65) Prior Publication Data

US 2022/0049536 A1 Feb. 17, 2022

(51) Int. Cl.
*E05F 5/06* (2006.01)
*F24C 15/02* (2006.01)

(52) U.S. Cl.
CPC .............. *E05F 5/06* (2013.01); *F24C 15/027* (2013.01); *E05Y 2900/308* (2013.01)

(58) Field of Classification Search
CPC ........ E05F 5/06; E05F 5/02; Y10T 403/7007; F16B 21/04; F24C 15/027
USPC .............................................................. 16/82
See application file for complete search history.

(56) References Cited

U.S. PATENT DOCUMENTS 162,934 A * 5/1875 Matsinger ................. E05F 5/06 16/86 A
1,073,253 A * 9/1913 Lavelle ..................... E05F 5/06 16/86 A
1,776,005 A 9/1930 Miller
1,880,190 A * 10/1932 Anderson ................. E05F 5/06 16/86 A
2,395,788 A * 2/1946 Luxem ..................... A47J 39/00 16/86 A
3,538,485 A * 11/1970 Hennessey, Jr. ...... H01R 13/635 439/258
4,651,962 A * 3/1987 Helgesson ................ B67B 7/36 30/433
4,756,638 A * 7/1988 Neyret ..................... E05B 9/084 70/451

(Continued)

FOREIGN PATENT DOCUMENTS

CN 106882021 A * 6/2017 ............ B60J 5/0468
CN 110080645 A 8/2019

(Continued)

OTHER PUBLICATIONS

English Translation of CN106882021 Deng (Year: 2017).*

*Primary Examiner* — Emily M Morgan
(74) *Attorney, Agent, or Firm* — Price Heneveld LLP

(57) ABSTRACT

A bumper assembly for an appliance may include a cabinet having a front panel, a door hingedly coupled with the cabinet and configured to selectively contact the front panel, and a bumper coupled to one of the door and front panel. The bumper may include a cap having an annular outer surface defining an interior, at least one flange coupled to the outer surface, the at least one flange extending along at least a portion of the annular outer surface, a through-hole in communication with the interior, and a fastener having an elastomeric cover. The fastener may be disposed within the interior and the through-hole when the bumper is in a mounted state.

6 Claims, 8 Drawing Sheets

(56) References Cited

U.S. PATENT DOCUMENTS

| | | | | | |
|---|---|---|---|---|---|
| 5,397,196 | A * | 3/1995 | Boiret | H01R 13/625 285/376 |
| 5,881,710 | A * | 3/1999 | Davis | F24C 15/023 126/200 |
| 6,295,697 | B1 * | 10/2001 | Simon | E05F 5/02 16/86 A |
| 6,507,976 | B2 * | 1/2003 | Ichimaru | E05F 5/022 248/188.4 |
| 10,150,444 | B1 * | 12/2018 | Schwalm | E05F 5/02 |
| 2011/0079573 | A1 * | 4/2011 | Nakamura | B65D 41/0492 215/331 |
| 2018/0126565 | A1 * | 5/2018 | Zheng | B25J 17/00 |
| 2019/0242169 | A1 * | 8/2019 | Diez Herrera | E05F 5/06 |

FOREIGN PATENT DOCUMENTS

| | | | | | |
|---|---|---|---|---|---|
| CN | 209687159 | U | | 11/2019 | |
| CN | 209687162 | | | 11/2019 | |
| CN | 111677396 | A | * | 9/2020 | |
| DE | 102011101393 | A1 | | 11/2012 | |
| DE | 102018125724 | A1 | * | 4/2019 | B60J 5/107 |
| DE | 102018125724 | A1 | | 4/2019 | |
| EP | 2420158 | A2 | | 2/2012 | |
| GB | 2113827 | B | | 1/1985 | |
| GB | 2519252 | A | | 4/2015 | |
| KR | 19980043044 | | | 8/1998 | |
| KR | 20190056022 | A | * | 5/2019 | |
| KR | 102475980 | B1 | * | 12/2022 | |
| WO | 9961740 | A1 | | 12/1999 | |

* cited by examiner

ADJUSTABLE BUMPER DESIGN FOR HOME APPLIANCES

FIELD OF DISCLOSURE

The present disclosure generally relates to a bumper, and more specifically, to an appliance bumper.

BACKGROUND

Many cooking appliances include a door hingedly coupled with a cabinet of the appliance. The door may be configured to selectively cover an access opening to a cooking compartment. For optimal thermal performance of an appliance, a good seal between the door and the cooking compartment is advantageous.

SUMMARY OF THE DISCLOSURE

According to one aspect of the present disclosure, a cooking appliance includes a cabinet defining a cooking compartment, a front panel coupled with the cabinet, wherein the front panel defines an access opening in communication with the cooking compartment, a door hingedly coupled with the cabinet and configured to selectively cover the access opening and a bumper coupled with an aperture defined by one of the door and front panel. The bumper includes a cap defining an interior and having a first end spaced from a second end by an annular sidewall, at least one flange coupled to an outer surface of the annular sidewall, a through-hole defined by the second end, a fastener receiver disposed within the interior and fixedly coupled with the second end, and a fastener having a shaft and a head, the head having an elastomeric cover. The shaft is disposed within the fastener receiver and the through-hole when the bumper is in a mounted state.

According to another aspect of the present disclosure, a bumper assembly for an appliance includes a cabinet having a front panel, a door hingedly coupled with the cabinet and configured to selectively contact the front panel, and a bumper coupled to one of the door and front panel. The bumper includes a cap having an annular outer surface defining an interior, at least one flange coupled to the outer surface, the at least one flange extending along at least a portion of the annular outer surface, a through-hole in communication with the interior, and a fastener having an elastomeric cover. The fastener is disposed within the interior and the through-hole when the bumper is in a mounted state.

According to yet another aspect of the present disclosure, a cooking appliance includes a cabinet having a front panel, wherein the front panel defines as access opening, a door hingedly coupled with the cabinet and configured to selectively cover the access opening, and a bumper coupled to one of the door and front panel. The bumper includes a cap defining an interior, at least one fin coupled to an outer surface of the cap, wherein the at least one fin lies in a plane which intersects with a plane defined by an upper surface of the cap, a through-hole defined by the cap, the through hole having a diameter less than a diameter of the interior, and a fastener having a shaft and a head, the head having an elastomeric cover. The shaft is disposed within the through-hole and the head is disposed within the interior when the bumper is in a mounted state.

These and other features, advantages, and objects of the present disclosure will be further understood and appreciated by those skilled in the art by reference to the following specification, claims, and appended drawings.

Figure 1:
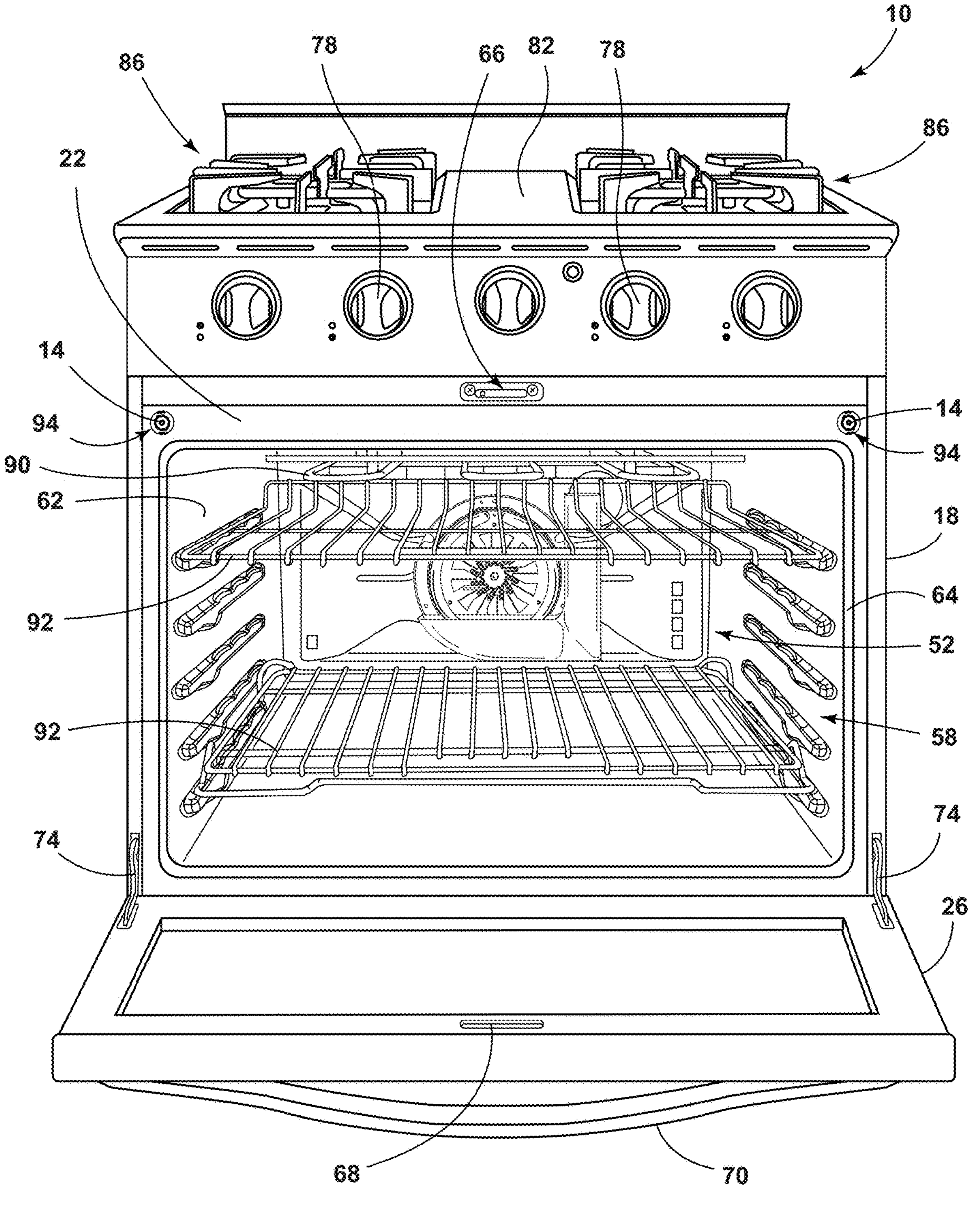
FIG. 1 is a front elevational view of a cooking appliance, according to various aspects described herein.

The components in the figures are not necessarily to scale, emphasis instead being placed upon illustrating the principles described herein.

DETAILED DESCRIPTION

The present illustrated embodiments reside primarily in combinations of method steps and apparatus components related to a bumper for an appliance. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring now to FIGS. 1-9, reference numeral 10 generally designates a cooking appliance. The cooking appliance 10 includes a bumper 14 and a cabinet 18. The cabinet 18 includes a front panel 22 and a door 26 hingedly coupled with the cabinet 18 and configured to selectively contact the front panel 22. The bumper 14 is coupled to one of the door 26 and front panel 22. The bumper 14 includes a cap 30 having an annular outer surface 34 defining an interior 38, at least one flange 42 coupled to the outer surface 34, the flange 42 extending along at least a portion of the annular outer surface 34, a through-hole 46 in communication with the interior 38, and a fastener 50 having an elastomeric cover 54. The fastener 50 is disposed within the interior 38 and the through-hole 46 when the bumper 14 is in a mounted state.

Referring now to FIG. 1, the cabinet 18 at least partially defines a cooking compartment 52. The front panel 22 is coupled with the cabinet 18 and defines an access opening 58 in communication with the cooking compartment 52. A cooking compartment liner 62 may be coupled with the front panel 22 of the cabinet 18 to align the cooking compartment 52 with the access opening 58 and define the cooking compartment 52 within the cabinet 18. The cooking appliance 10 may include a gasket 64 coupled to one of the door 26 and front panel 22. As illustrated, the gasket 64 is coupled to the front panel 22. The gasket 64 is configured to aid in sealing the door 26 to retain heat inside of the cooking compartment 52. The front panel 22 may further define a latch opening 66 configured to receive a latch 68 on the door 26 when the door 26 is in a closed position. As illustrated in FIG. 1, the door 26 is in an open position. The door 26 may be configured to selectively cover the access opening 58, or contact the front panel 22 and be in alignment with the front panel 22 in the closed position. In some implementations, a handle 70 is coupled with the door 26 to facilitate opening and closing of the access opening 58 by a user. Further, hinge assemblies 74 may be coupled with the door 26 and the cabinet 18 to provide support and articulation between the open and closed positions of the door 26. When the door 26 is in the open position, the cooking compartment 52 is accessible through the access opening 58. When the door 26 is in the closed position, the cooking compartment 52 is not accessible through the access opening 58.

The cooking appliance 10 may further include a plurality of user inputs 78 positioned on the cabinet 18. The user inputs 78 may include knobs, a touch display, or any other user input capable of providing instructions regarding the operation of the appliance 10 without departing from the scope of the present disclosure. As illustrated in FIG. 1, the cooking appliance includes a top cabinet surface 82 including a plurality of cooking assemblies 86. The cooking assemblies 86 may include burner assemblies, heating elements, or any other cooking assembly without departing from the scope of the present disclosure. In some aspects, the cooking appliance 10 includes heating assemblies 90 configured to heat the cooking compartment 52 and racks 92 configured to support items for cooking. The heating assemblies 90 may include burner units, heating elements, or any other cooking assembly capable of cooking without departing from the scope of the present disclosure.

As illustrated in FIG. 1, the bumper 14 is coupled with the front panel 22 in the mounted state, which may include at an upper corner of the front panel 22. The front panel 22 may define a mounting aperture 94 configured to receive the bumper 14. The mounting aperture 94 may have a smaller diameter than the diameter of the bumper 14 in order to retain the bumper 14 in position. Typically, bumpers are configured to have a fixed height relative to the cooking appliance 10 and are not adjustable. The bumper 14 of the present disclosure provides adjustability of bumper height relative to the door 26 or front panel 22 of the cooking appliance 10. As a suitable amount of compression of the gasket 64 is beneficial for an adequate door seal, and the bumper 14 of the present disclosure can be adjusted to a desired position that facilitates an appropriate amount of compression of the gasket 64 to seal the door 26 in the closed position. In addition to providing for the appropriate amount of compression of the gasket 64, the bumper 14 provides for an appropriate alignment between the door 26 and adjacent panels on the cooking appliance 10 when the door 26 is in the closed position. The appropriate alignment between the door 26 and the panels of the cooking appliance 10 improves the overall aesthetic and craftsmanship of the cooking appliance 10.

Figure 2:
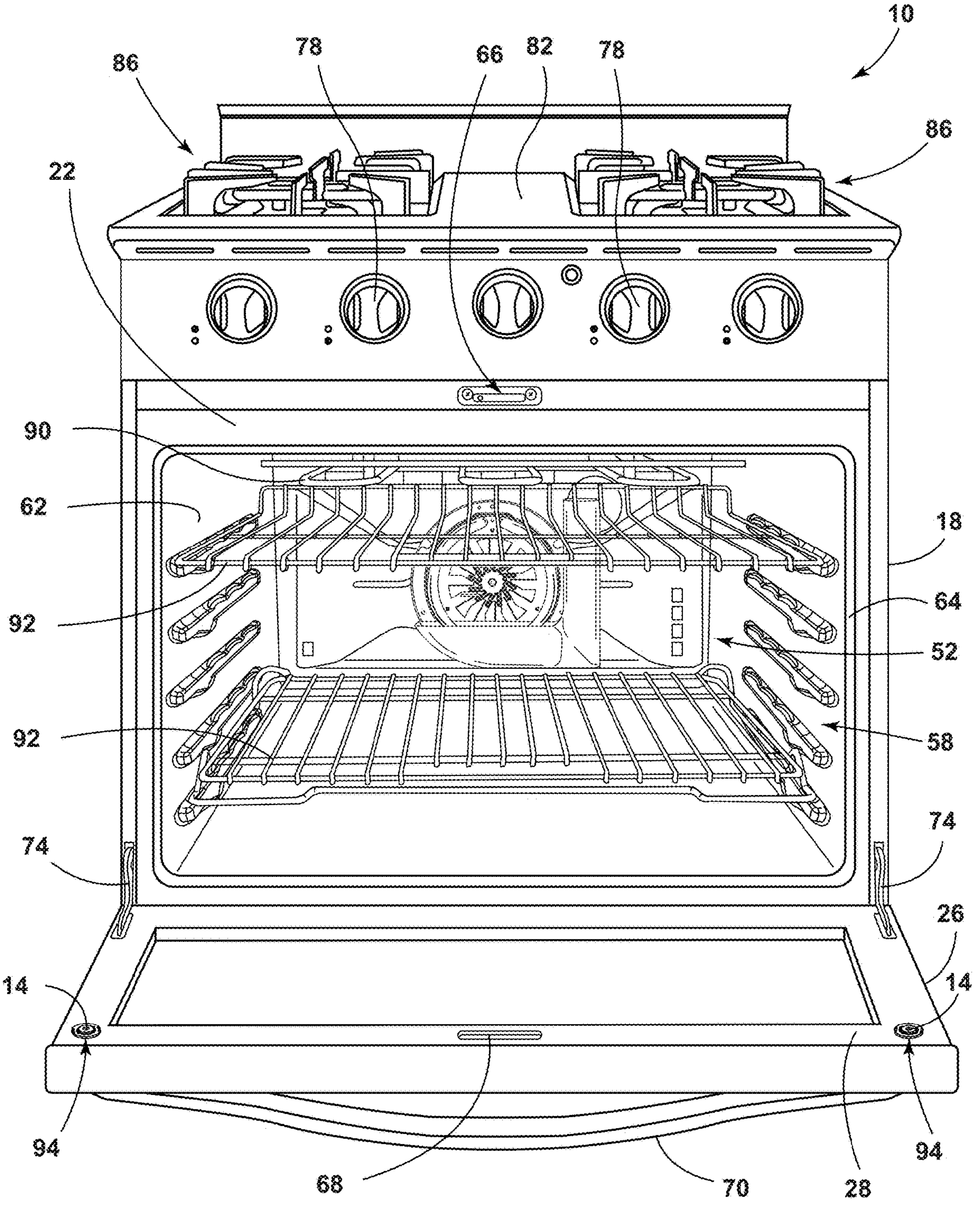
FIG. 2 is a front elevational view of the cooking appliance of FIG. 1, according to various aspects described herein.

Referring now to FIG. 2, the bumper 14 is coupled with the door 26, which may include at an upper corner of the door 26 when the door 26 is in the closed position. An inner surface 28 of the door 26 may define the mounting aperture 94 configured to receive the bumper 14. As with the mounting aperture 94 on the front panel 22, the mounting aperture 94 on the inner surface 28 of the door 26 may have a smaller diameter than the diameter of the bumper 14 in order to retain the bumper 14 in position.

Figure 3:
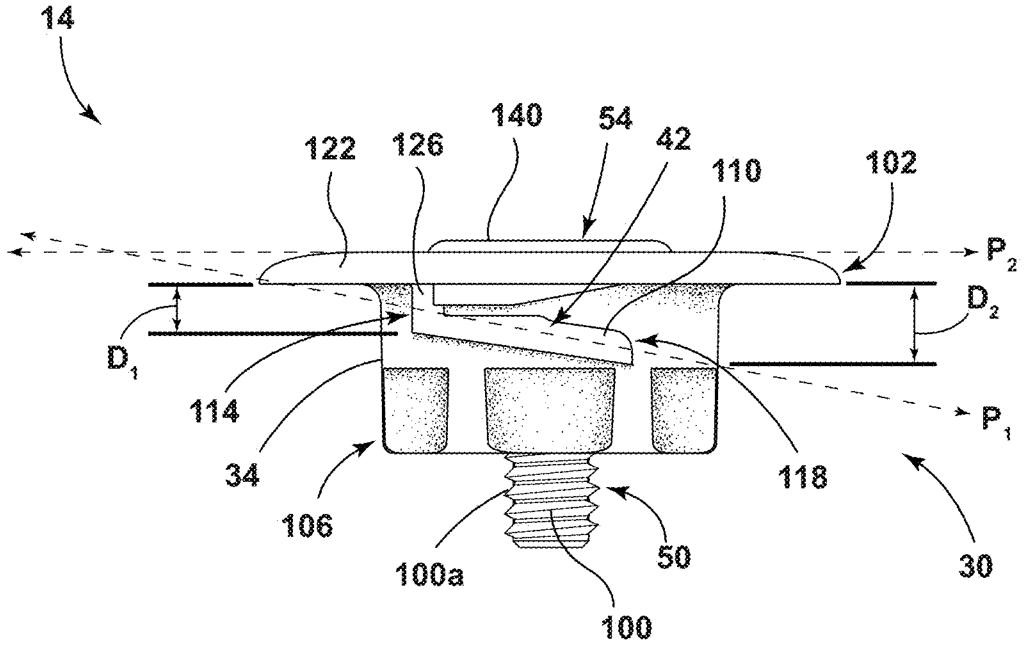
FIG. 3 is a front elevational view of a bumper, according to various aspects described herein.

FIG. 3 illustrates a front elevational view of the bumper 14, according to various aspects described herein. As previously described, the bumper 14 includes the cap 30 having the annular outer surface 34, or annular sidewall. The cap 30 may be formed by injection molding a plastic, such as a nylon plastic. The at least one flange 42 is coupled to the outer surface 34 and extends along at least a portion of the annular outer surface 34. As illustrated, the fastener 50 is disposed within the cap 30 such that a shaft 100 of the fastener 50 extends beyond the cap 30 in the mounted state. The fastener 50 may include threads **100*a* on a shaft to convert between rotational and linear movement for adjusting the height of the bumper 14 relative to the cooking appliance 10. In this way, rotation of the fastener 50 adjusts the height of the bumper 14 relative to the one of the door 26 and front panel 22. In some implementations, the threads 100*a* are distorted at a distal end of the shaft 100 to prevent removal of the bumper 14 from the cooking appliance 10 once the bumper 14** has been mounted.

Still referring to FIG. 3, the cap 30 may include a first end 102 spaced from a second end 106 by the annular outer surface 34, or annual sidewall. In some implementations, the flange 42 is in the form of a fin, which projects from the annual outer surface 34. The flange 42 may include an upper surface 110, which is sloped with respect to the first end 102 of the cap 30. In this way, the flange 42 includes a first flange end 114 spaced from the first end 102 of the cap 30 by a first distance, $D_1$, and a second flange end 118 spaced from the first end 102 of the cap 30 by a second distance, $D_2$, larger than the first distance, D1. Stated another way, the flange 42, or fin, lies in a first plane, $P_1$, which intersects with a second plane, $P_2$, defined by an upper surface 122 of the cap 30. Accordingly, the second flange end 118 may be spaced further from the upper surface 122 of the cap 30 than the first flange end 114. The upper surface 122 of the cap 30 may be include a disc shape that extends beyond the annular outer surface 34. As such, the upper surface 122 may include a diameter larger than the diameter defined by the annular outer surface 34.

The bumper 14 may include a stop 126 disposed at the first flange end 114 of the flange 42. The stop 126 is configured to prevent rotation of the cap 30 in the mounted state. In some aspects, the stop 126 is coupled with the first end 102 of the cap, or an upper portion 102 of the cap 30, such that the stop 126 is in contact with the first end 102. The stop 126 and the flange 42 on the cap 30 may provide a twist and lock feature for fastening the adjustable bumper 14 to the appliance 10.

Figure 4A:
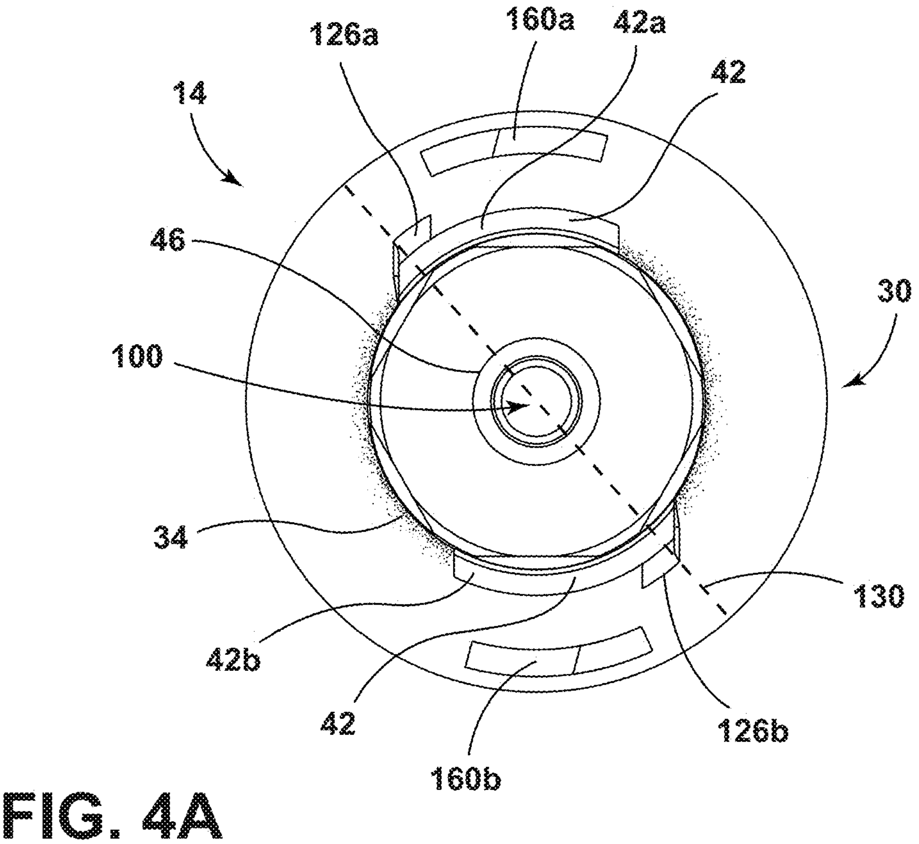
FIG. 4A is a bottom view of the bumper of FIG. 3, according to various aspects described herein.
Figure 6:
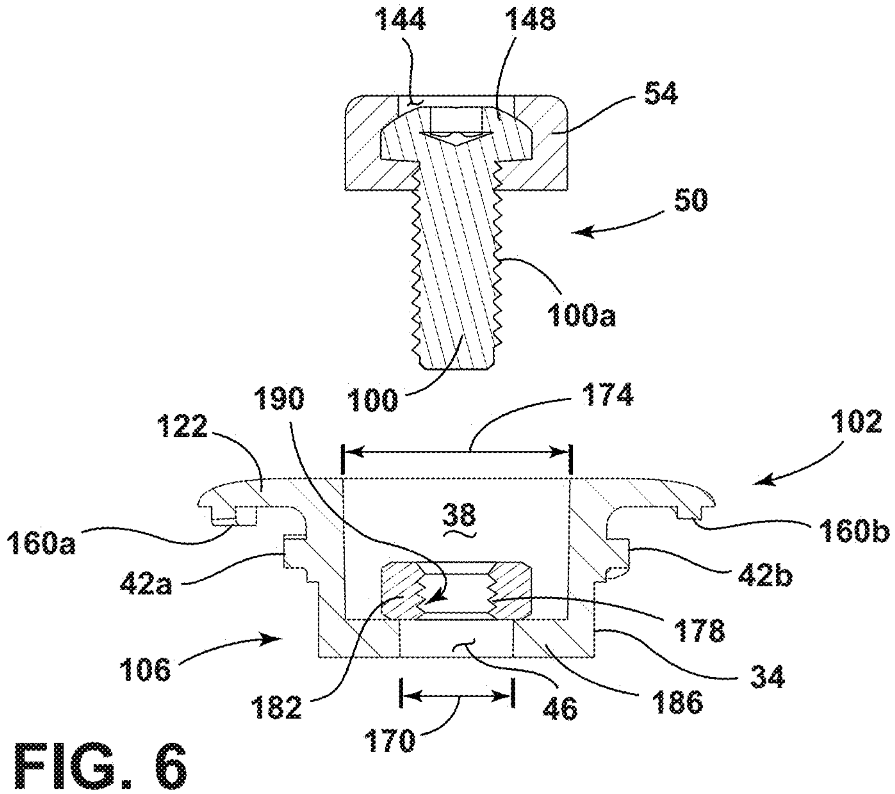
FIG. 6 is a cross-sectional view along line VI-VI in FIG. 5, according to various aspects described herein.

Referring now to FIG. 4A, which illustrates a bottom view of the bumper 14, the bumper 14 may include a pair of flanges 42 or a first flange 42*a* and a second flange 42*b*. As illustrated, the first flange 42*a* and the second flange 42*b* are disposed in an opposing manner on the annular outer surface 34, which may include a diametrically opposing manner. In this way, the bumper 14 includes a first stop 126*a* and a second stop 126*b* disposed on a diameter segment 130 of the cap 30. The first flange 42*a* and the second flange 42*b* each extend from the outer surface 34 of the cap 30, as best illustrated in FIG. 6.

Figure 4B:
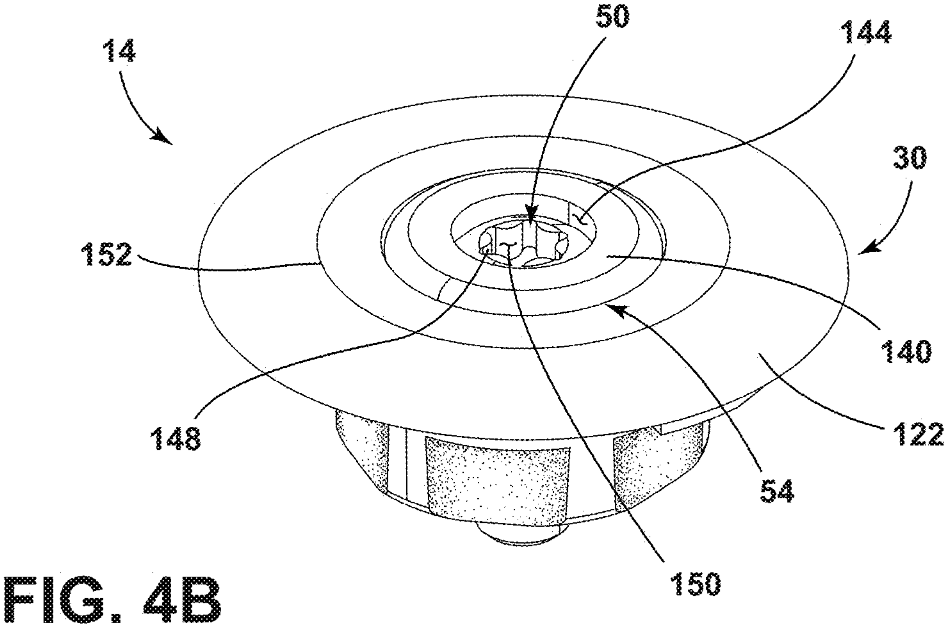
FIG. 4B is a top perspective view of the bumper of FIG. 3, according to various aspects described herein.

Referring now to FIG. 4B, which illustrates a top perspective view of the bumper 14, an upper surface 140 of the elastomeric cover 54 may be positioned one of planar with and above the upper surface 122 of the cap 30 in the mounted state. As illustrated in FIG. 3 and FIG. 4B, the upper surface 140 of the elastomeric cover 54 is positioned above the upper surface 122 of the cap 30. The bumper 14 may include an aperture 144 defined by the elastomeric cover 54. The aperture 144 is configured to allow access by a tool to a head 148 of the fastener 50 for rotating the fastener 50 to adjust the position of the bumper 14 relative to the cooking appliance 10. The head 148 may include a recess 150 configured to receive the tool. The upper surface 122 may define an aperture 152 configured to receive the elastomeric cover 54 and the head 148 of the fastener 50. The aperture 152 may be in communication with the interior 38 (FIG. 6) of the cap 30 such that the elastomeric cover 54 and the head 148 may be at least partially inserted into the interior 38 (FIG. 6) of the cap 30. Accordingly, at least a portion of the head 148 may be disposed within the interior 38 (FIG. 6) of the cap 30 in the mounted state.

Figure 5:
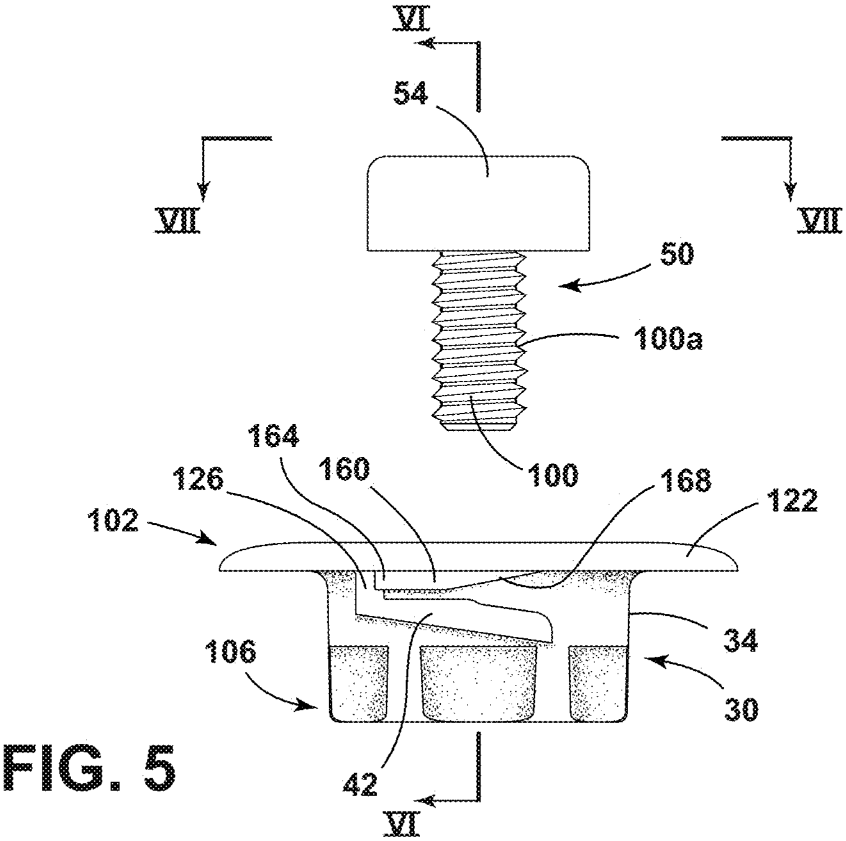
FIG. 5 is an exploded view of the bumper of FIG. 3, according to various aspects described herein.

FIG. 5 illustrates an exploded view of the bumper 14 of FIG. 3, more clearly illustrating the elastomeric cover 54 coupled with the fastener 50. In some aspects, the fastener 50 is any suitable fastener known in the art, such as a standard screw. The elastomeric cover 54 may include a rubber material, which may be over-molded onto the head 148 of the fastener 50.

Additionally, the cap 30 may include a wedge 160 depending from the first end 102. As illustrated in FIG. 5, the wedge 160 includes a thick edge 164 tapering to a thin edge 168. Referring back to FIG. 4A, the cap 30 may include a first wedge 160*a* and a second wedge 160*b* disposed in an opposing manner and in alignment with the first flange 42*a* and the second flange 42*b*. In some aspects, the first wedge 160*a* and the second wedge 160*b* cooperate with the first flange 42*a* and the second flange 42*b* and the corresponding first stop 126*a* and second stop 126*b* to produce the twist and lock feature. In this way, the one of the front panel 22 and door 26 is disposed, or constrained, between the wedge 160 and the flange 42 to retain the bumper 14 in position. According to various aspects, the first wedge 160*a* and the second wedge 160*b* may produce an audible 'click' sound as part of the twist and lock feature that notifies an installer when the cap 30 is fully seated or mounted.

FIG. 6 illustrates a cross-sectional view along line VI-VI in FIG. 5, more clearly illustrating how the first flange 42*a* and the second flange 42*b* extend from the outer surface 34 of the cap 30. Additionally, FIG. 6 more clearly illustrates the first wedge 160*a* and the second wedge 160*b* extending from the cap 30. The first wedge 160*a* and the second wedge 160*b* may extend from a lower surface (e.g., opposing the upper surface 122) of the first end 102 of the cap 30 adjacent to the annular outer surface 34. The first wedge 160*a* and the second wedge 160*b* may each be disposed adjacent an outer edge of the cap 30 and spaced from the first flange 42*a* and the second flange 42*b*, respectively.

Figure 7:
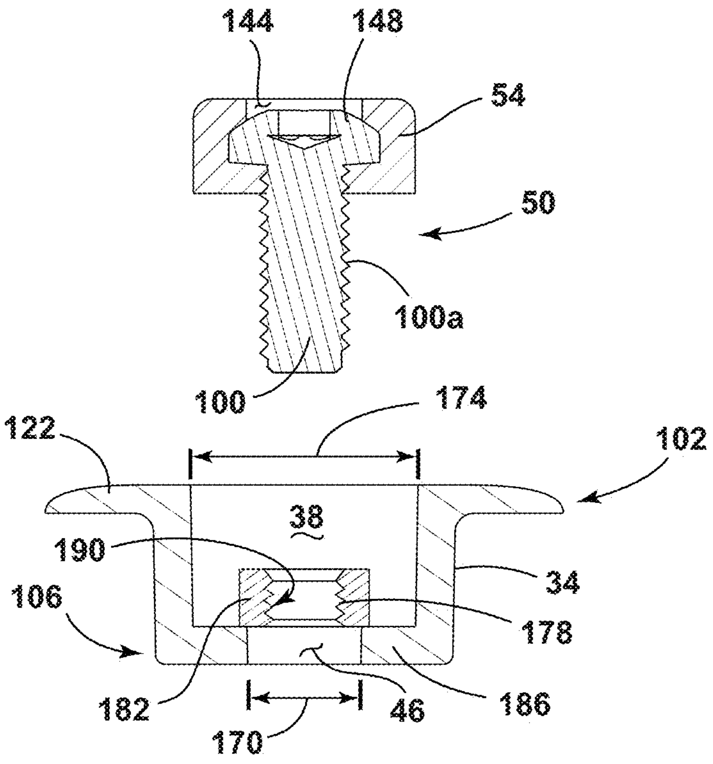
FIG. 7 is a cross-sectional view along line VII-VII in FIG. 5, according to various aspects described herein.

FIG. 7 illustrates a cross-sectional view along line VII-VII in FIG. 5, more clearly illustrating the interior 38 of the cap 30. As illustrated, the through-hole 46 is defined by the second end 106 of the cap 30 and is in communication with the interior 38. The through-hole 46 includes a diameter 170 less than a diameter 174 of the interior 38. A fastener receiver 178, which may be in the form of a nut 182, may be disposed within the interior 38 and in alignment with the through-hole 46. In this way, at least a portion of the shaft 100 may be disposed within the fastener receiver 178 and the through-hole 46 when the bumper 14 is in a mounted state. The fastener receiver 178 may include internal threads 190, which are complementary to the threads 100*a*. Optionally, the fastener receiver 178 is fixedly coupled with the second end 106 of the cap 30, which may include to adhesively fixed to a lower surface 186 of the cap 30. In some aspects, the fastener receiver 178 is molded within the cap 30, thereby forming a single piece.

Figure 8:
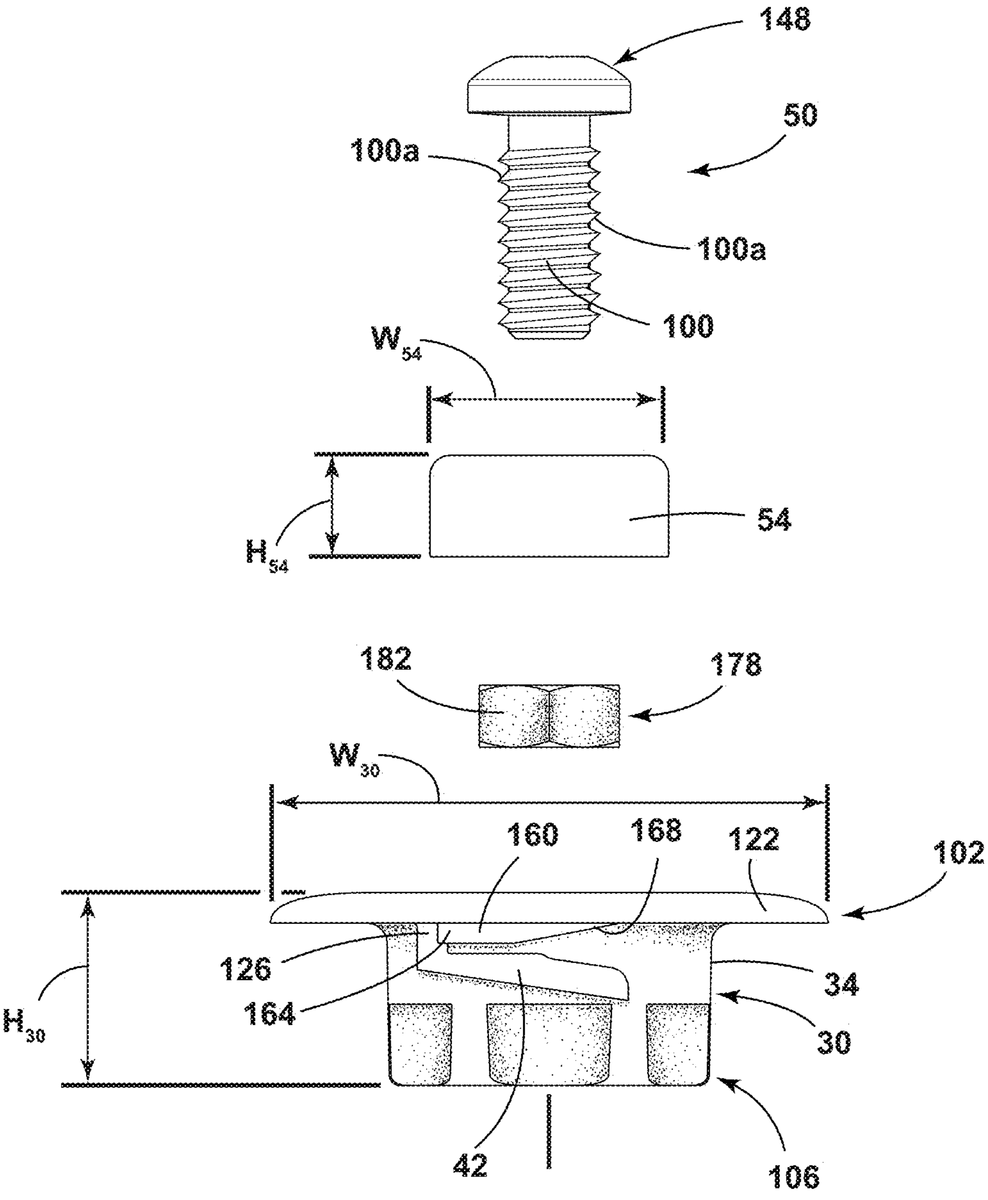
FIG. 8 is another exploded view of the bumper of FIG. 3, according to various aspects described herein.

Referring now to FIG. 8, the fastener receiver 178 and the head 148 of the fastener 50 are more clearly illustrated. In some aspects, the elastomeric cover 54 includes a height, $H_{54}$, which is approximately 5.0 mm and a width, $W_{54}$, which is approximately 11.8 mm, but is not limited to such dimensions. Further, the cap 30 may include a height, $H_{30}$, of approximately 9.5 mm and a width, $W_{30}$, which is approximately 27.4 mm, but is not limited to such dimensions.

Figure 9:
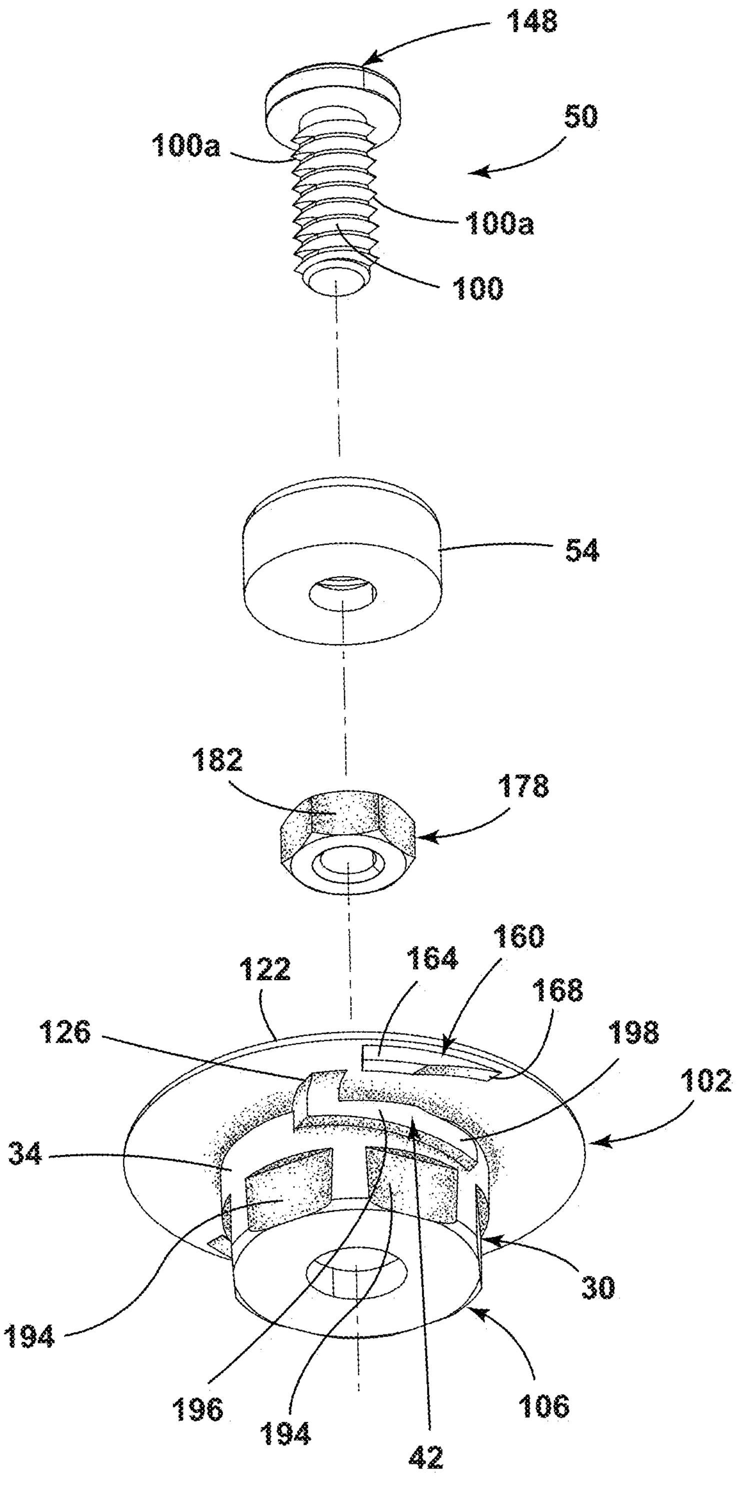
FIG. 9 is an exploded, bottom perspective view of the bumper of FIG. 3, according to various aspects described herein.

FIG. 9 illustrates an exploded, bottom perspective view of the bumper 14. The annular outer surface 34 may include a plurality of recesses 194 defined in the circumference thereof. The recesses 194 facilitate installation of the cap 30 into the mounting aperture 94 on the door 26 or front panel 22 with a tool, such as a wrench or socket. FIG. 9 more clearly illustrates the stop 126 on the flange 42 in contact with and depending from the first end 102. The portion of the flange 42 including the stop 126 may be wider than the portion of the flange 42 not including the stop 126. Further, the flange 42 may include a lower surface 196, which is sloped with respect to the first end 102 of the cap 30 and is spaced from the upper surface 110 (FIG. 3) of the flange 42 to define a flange body 198. The stop 126 may be generally perpendicular to the flange body 198 such that the stop 126 extends from the flange body 198 to contact the first end 102.

According to one aspect of the present disclosure, a cooking appliance may include a cabinet defining a cooking compartment, a front panel coupled with the cabinet, wherein the front panel defines an access opening in communication with the cooking compartment, a door hingedly coupled with the cabinet and configured to selectively cover the access opening and a bumper coupled with an aperture defined by one of the door and front panel. The bumper may include a cap defining an interior and having a first end spaced from a second end by an annular sidewall, at least one flange coupled to an outer surface of the annular sidewall, a through-hole defined by the second end, a fastener receiver disposed within the interior and fixedly coupled with the second end, and a fastener having a shaft and a head, the head having an elastomeric cover. The shaft may be disposed within the fastener receiver and the through-hole when the bumper is in a mounted state.

According to another aspect, an upper surface of the at least one flange may be sloped with respect to the first end of the cap.

According to another aspect, the at least one flange may include a stop disposed at an end of the at least one flange, the stop coupled with the first end of the cap and configured to prevent rotation of the cap in the mounted state.

According to another aspect, a pair of flanges may be disposed in an opposing manner on the annular sidewall.

According to another aspect, an upper surface of the elastomeric cover may be positioned one of planar with and above an upper surface of the cap in the mounted state.

According to another aspect, an aperture may be defined by the elastomeric cover, the aperture configured to allow access by a tool to the head of the fastener.

According to yet another aspect of the present disclosure, a bumper assembly for an appliance may include a cabinet having a front panel, a door hingedly coupled with the cabinet and configured to selectively contact the front panel, and a bumper coupled to one of the door and front panel. The bumper may include a cap having an annular outer surface defining an interior, at least one flange coupled to the outer surface, the at least one flange extending along at least a portion of the annular outer surface, a through-hole in communication with the interior, and a fastener having an elastomeric cover. The fastener may be disposed within the interior and the through-hole when the bumper is in a mounted state.

According to another aspect, a fastener receiver may be disposed within the interior of the cap.

According to another aspect, the fastener receiver may be molded within the cap, thereby forming a single piece.

According to another aspect, the at least one flange may include a first flange and a second flange disposed in an opposing manner on the annular outer surface.

According to another aspect, an upper surface of the elastomeric cover may be positioned one of planar with and above an upper surface of the cap in the mounted state.

According to another aspect, the at least one flange may include a stop disposed at an end of the at least one flange, the stop coupled with an upper portion of the cap and configured to prevent rotation of the cap in the mounted state.

According to another aspect, an upper surface of the at least one flange may be sloped with respect to an upper portion of the cap.

According to yet another aspect of the present disclosure, a cooking appliance may include a cabinet having a front panel, wherein the front panel defines as access opening, a door hingedly coupled with the cabinet and configured to selectively cover the access opening, and a bumper coupled to one of the door and front panel. The bumper may include a cap defining an interior, at least one fin coupled to an outer surface of the cap, wherein the at least one fin lies in a plane which intersects with a plane defined by an upper surface of the cap, a through-hole defined by the cap, the through-hole having a diameter less than a diameter of the interior, and a fastener having a shaft and a head, the head having an elastomeric cover. The shaft may be disposed within the through-hole and the head may be disposed within the interior when the bumper is in a mounted state.

According to another aspect, the at least one fin may include a first end and a second end and the second end is spaced further from the upper surface of the cap than the first end.

According to another aspect, the bumper may include a stop disposed at an end of the at least one fin, the stop configured to prevent rotation of the cap in the mounted state.

According to another aspect, the at least one fin may include a first fin and a second fin arranged in an opposing manner on the outer surface.

According to another aspect, a first stop may be disposed on the first fin and a second stop may be disposed on the second fin, wherein the first stop and the second stop are disposed on a diameter segment of the cap.

According to another aspect, a fastener receiver may be disposed within the interior of the cap and in alignment with the through-hole.

According to another aspect, the fastener receiver may be molded within the cap, thereby forming a single piece.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance, comprising:

a cabinet having a front panel, wherein the front panel defines as access opening;

a door hingedly coupled with the cabinet and configured to selectively cover the access opening;

a bumper coupled to one of the door and front panel, the bumper comprising:

a cap defining an interior and including a disc-shaped upper portion at an end thereof;

at least one flange coupled to an annular outer sidewall of the cap, wherein the at least one flange lies in a first plane which intersects with a second plane defined by the disc-shaped upper portion of the cap, further wherein the at least one flange comprises a first end and a second end and the second end is spaced further from the disc-shaped upper portion of the cap than the first end;

a stop disposed at an end of the at least one flange, the stop extending from a body of the flange toward the disc-shaped upper portion;

a through-hole defined by the cap, the through-hole having a diameter less than a diameter of the interior; and a fastener having a shaft and a head, the head having an elastomeric cover, wherein the shaft is disposed within the through-hole and the head is disposed within the interior when the bumper is in a mounted state.

2. The cooking appliance of claim 1, further comprising:

at least one wedge depending from the disc-shaped upper portion of the cap adjacent the at least one flange.

3. The cooking appliance of claim 1, wherein the at least one flange comprises a first flange and a second flange arranged in an opposing manner on the outer surface.

4. The cooking appliance of claim 3, further comprising:

a first stop disposed on the first flange; and a second stop disposed on the second flange, wherein the first stop and the second stop are arranged in a diametrically opposing manner on the annular outer sidewall of the cap.

5. The cooking appliance of claim 4, further comprising:

include a first wedge depending from the disc-shaped upper portion of the cap adjacent the first flange; and a second wedge depending from the disc-shaped upper portion of the cap adjacent the seconder flange and disposed in an opposing manner from the first wedge.

6. The cooking appliance of claim 5, wherein the first wedge and the second wedge are disposed adjacent an outer edge of the cap.

* * * * *